(12) United States Patent
Mahajan et al.

(10) Patent No.: US 11,171,553 B2
(45) Date of Patent: Nov. 9, 2021

(54) HIGH DETENT TORQUE PERMANENT MAGNET STEPPER MOTOR

(71) Applicant: HONEYWELL INTERNATIONAL INC., Morris Plains, NJ (US)

(72) Inventors: Deepak Pitambar Mahajan, Bangalore (IN); Sivanagamalleswara Bavisetti, Bangalore (IN); Ramakrishna Rao P. V, Bangalore (IN); Subhashree Rajagopal, Bangalore (IN); Renukaprasad N, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 167 days.

(21) Appl. No.: 16/518,533

(22) Filed: Jul. 22, 2019

(65) Prior Publication Data
US 2021/0028681 A1 Jan. 28, 2021

(51) Int. Cl.
*H02K 37/14* (2006.01)
*H02K 3/02* (2006.01)

(52) U.S. Cl.
CPC .............. *H02K 37/14* (2013.01); *H02K 3/02* (2013.01); *H02K 2213/03* (2013.01)

(58) Field of Classification Search
CPC ...... H02K 2213/03; H02K 37/14; H02K 3/02; H02K 1/278; H02K 21/16; H02K 29/03
USPC ............................. 310/49.32, 156.15, 156.38
See application file for complete search history.

(56) References Cited

U.S. PATENT DOCUMENTS

| | | | | |
|---|---|---|---|---|
| 4,751,416 A | * | 6/1988 | Torok ................... | H02K 21/14 310/156.19 |
| 4,769,567 A | * | 9/1988 | Kurauchi .............. | H02K 21/14 310/156.45 |
| 4,950,960 A | * | 8/1990 | Krefta .................. | H02K 1/278 310/156.43 |
| 5,631,512 A | * | 5/1997 | Kawabata ............. | H02K 1/278 310/156.15 |
| 5,705,871 A | * | 1/1998 | Suzuki ................. | G01D 5/2033 310/156.44 |
| 5,789,841 A | | 8/1998 | Wang | |
| 6,222,288 B1 | * | 4/2001 | Benito Izquierdo ... | H02K 29/03 310/216.004 |
| 6,885,125 B2 | * | 4/2005 | Inayama ............... | H02K 1/278 29/596 |
| 7,102,263 B2 | * | 9/2006 | Takano ................. | H02K 1/276 310/156.53 |
| 7,307,366 B2 | | 12/2007 | Ionel et al. | |
| 7,592,729 B2 | * | 9/2009 | Hahn ................... | H02K 1/278 310/156.48 |

(Continued)

*Primary Examiner* — Alex W Mok
(74) *Attorney, Agent, or Firm* — Lorenz & Kopf, LLP

(57) ABSTRACT

A stepper motor includes a rotor, a stator, a plurality of stator windings, and a plurality of permanent magnets. The permanent magnets are coupled to the outer surface of the rotor and are spaced apart from the plurality of stator poles, and each permanent magnet is shaped like an arc having an arc length and is circumferentially spaced apart from two adjacent permanent magnets by a spacing angle. In some instance, the arc length of each permanent magnet is equal, and the spacing angles are not all equal. In other instances, the arc length of two or more of the permanent magnets is unequal to the arc lengths of the other permanent magnets, and the spacing angles are not all equal.

18 Claims, 7 Drawing Sheets

(56) References Cited

U.S. PATENT DOCUMENTS

| | | | | |
|---|---|---|---|---|
| 7,714,473 | B2* | 5/2010 | Clark | H02K 21/14 |
| | | | | 310/156.45 |
| 8,288,909 | B2* | 10/2012 | Clark | H02K 1/278 |
| | | | | 310/156.45 |
| 2002/0074887 | A1* | 6/2002 | Takano | H02K 21/16 |
| | | | | 310/156.53 |
| 2002/0140308 | A1* | 10/2002 | Inayama | H02K 1/278 |
| | | | | 310/156.47 |
| 2004/0070300 | A1* | 4/2004 | Fu | H02K 1/278 |
| | | | | 310/156.47 |
| 2004/0070361 | A1* | 4/2004 | Carrier | H02K 15/03 |
| | | | | 318/700 |
| 2005/0099082 | A1* | 5/2005 | Nashiki | H02K 21/145 |
| | | | | 310/164 |
| 2006/0038457 | A1* | 2/2006 | Miyata | H02K 1/278 |
| | | | | 310/156.45 |
| 2010/0026128 | A1 | 2/2010 | Ionel | |
| 2010/0123426 | A1* | 5/2010 | Nashiki | H02K 1/12 |
| | | | | 318/701 |
| 2014/0145525 | A1* | 5/2014 | Dooley | H02K 1/278 |
| | | | | 310/51 |
| 2015/0048704 | A1* | 2/2015 | Fahimi | H02K 16/04 |
| | | | | 310/156.01 |
| 2015/0091407 | A1* | 4/2015 | Kayano | H02K 1/2766 |
| | | | | 310/156.38 |
| 2017/0040853 | A1* | 2/2017 | Totaro | H02K 29/03 |

* cited by examiner

HIGH DETENT TORQUE PERMANENT MAGNET STEPPER MOTOR

TECHNICAL FIELD

The present invention generally relates to stepper motors, and more particularly relates to high detent torque permanent magnet stepper motors.

BACKGROUND

Stepper motors are used in myriad systems and environments. For example, many aircraft valves use a stepper motor as the valve actuator to provide precise angular valve movement. One of the main requisites for many of these aircraft valves is that the actuator be capable of moving the valve element to a particular angle when input power is applied, and then holding the valve element at that position when the input power is removed. Thus, a particular type of stepper motor, known as a permanent magnet (PM) stepper motor, is often used in for this type of application due to its ability to produce a relatively high torque (e.g., comparable to the running torque) when the input power is removed. This torque is known as "detent torque" or "cogging torque," and is generally desirable because it reduces stepper motor power consumption, making it more efficient.

In typical PM stepper motors, the permanent magnets are symmetrically disposed around the rotor. To generate a relatively high detent torque, the PM stepper motor may be designed to generate relatively higher magnetic flux by, for example, using relatively thicker magnets and/or a providing a relatively smaller airgap and/or increasing stator core thickness to operate below the saturation region. This may also require the number of stator winding turns be increased in order to generate sufficient running torque to overcome higher detent torque. All of these can increase overall motor weight and manufacturing costs.

Hence, there is a need for a PM stepper motor that can generate relatively high detent torque without having to use relatively thicker magnets and/or a provide a relatively smaller airgap and/or increase stator core thickness to operate below the saturation region and/or increase the number of stator winding turns. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a stepper motor includes a rotor, a stator, a plurality of stator windings, and a plurality of permanent magnets. The rotor has an outer surface that defines a circumference and is rotor rotatable about a rotational axis. The stator surrounds at least a portion of the rotor and has a plurality of stator poles extending radially inwardly toward the rotor. Each stator winding is wound around a different one of the stator poles. The permanent magnets are coupled to the outer surface of the rotor and are spaced apart from the plurality of stator poles. Each permanent magnet is shaped like an arc having an arc length, and each permanent magnet circumferentially spaced apart from two adjacent permanent magnets by a spacing angle. The arc length of each permanent magnet is equal and has an associated center point, each permanent magnet has an axis of symmetry that extends perpendicularly from the rotational axis through its associated center point, the spacing angle is defined as an angle between the axis of symmetry of the two adjacent permanent magnets, and the spacing angles are not all equal.

In another embodiment, a stepper motor includes a rotor, a stator, a plurality of stator windings, and a plurality of permanent magnets. The rotor has an outer surface that defines a circumference and is rotor rotatable about a rotational axis. The stator surrounds at least a portion of the rotor and has a plurality of stator poles extending radially inwardly toward the rotor. Each stator winding is wound around a different one of the stator poles. The permanent magnets are coupled to the outer surface of the rotor and are spaced apart from the plurality of stator poles. Each permanent magnet is shaped like an arc having an arc length, and each permanent magnet circumferentially spaced apart from two adjacent permanent magnets by a spacing angle. The arc length of two or more of the permanent magnets is unequal to the arc lengths of the other permanent magnets, the arc length of each permanent magnet has an associated center point, each permanent magnet has an axis of symmetry that extends perpendicularly from the rotational axis through its associated center point, the spacing angle is defined as an angle between the axis of symmetry of the two adjacent permanent magnets, and the spacing angles are not all equal.

Furthermore, other desirable features and characteristics of the permanent magnet stepper motor will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
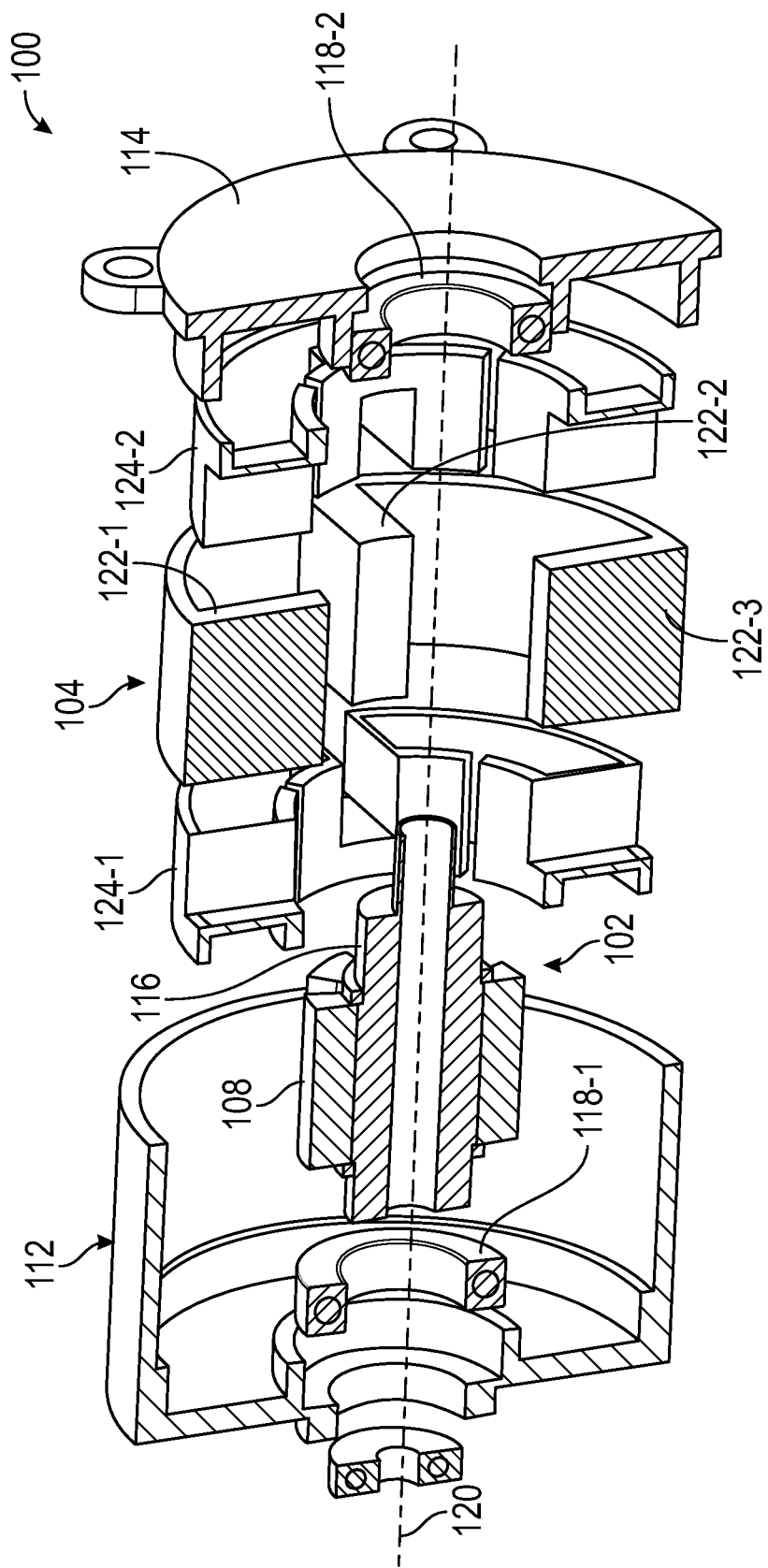
FIG. 1 is an exploded cross section view of one embodiment of a permanent magnet stepper motor.
Figure 2:
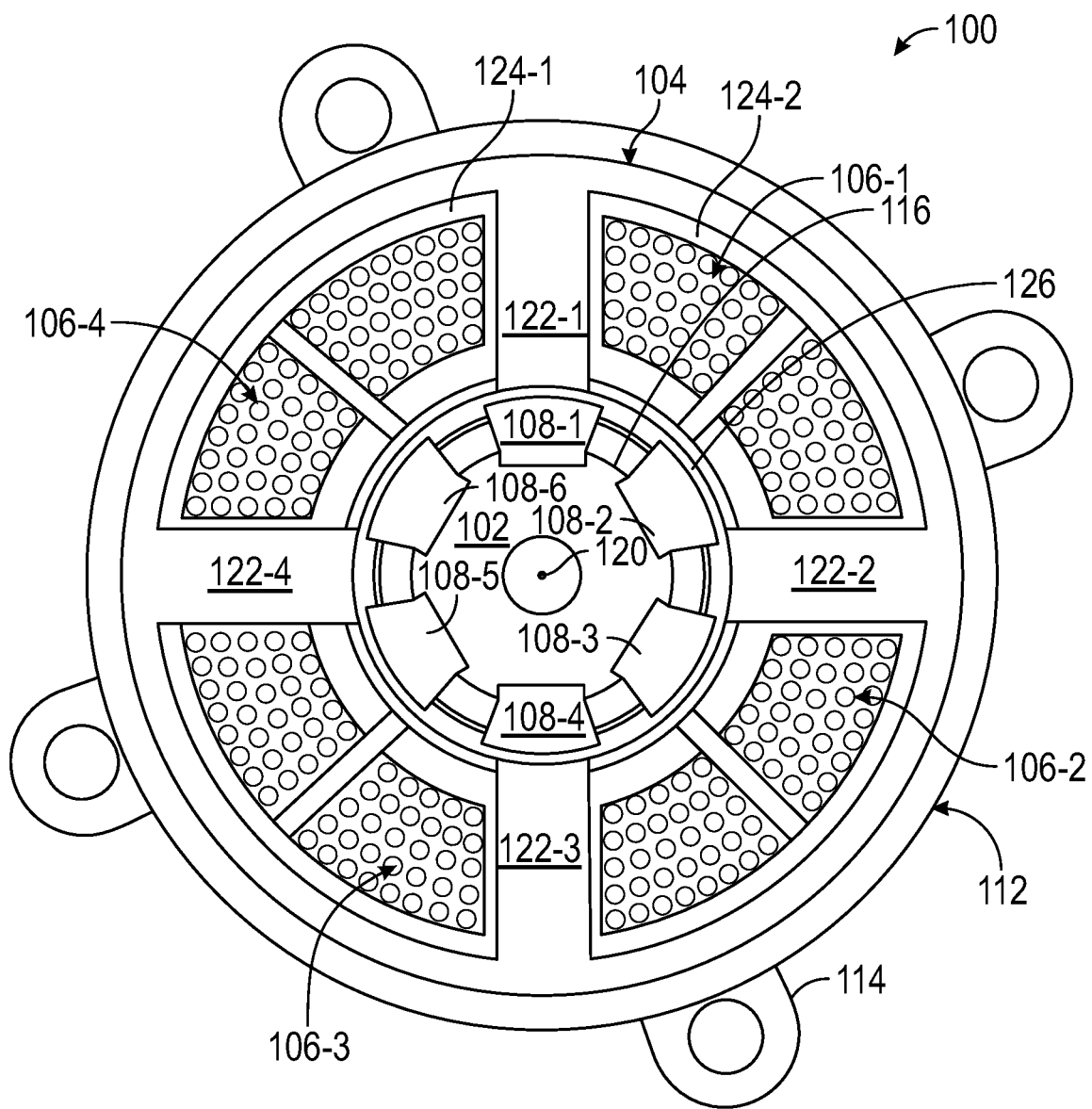
FIG. 2 is an assembled cross section view of the permanent magnet stepper motor depicted in FIG. 1.

Referring now to FIGS. 1 and 2, an exploded cross section view (FIG. 1) and an assembled cross section view (FIG. 2) of one embodiment of a permanent magnet stepper motor 100. The depicted permanent magnet stepper motor 100 includes a rotor 102, a stator 104, a plurality of stator winding 106 (not depicted in FIG. 1), and a plurality of permanent magnets 108, all of which are secured within a housing 112 via a cover plate 114.

The rotor 102 has an outer surface 116 that defines a circumference. The rotor 102 is rotationally mounted within the housing 112 via a plurality of bearing assemblies 118 (118-1, 118-2), and is thus rotatable about a rotational axis 120.

The stator 104 surrounds at least a portion of the rotor 102 and has a plurality of stator poles 122 extending radially inwardly toward the rotor 102. In the depicted embodiment, the stator 104 includes four stator poles 122 (122-1, 122-2, 122-3, 122-4). It will be appreciated, however, that in other embodiments the stator 104 could be implemented with more than this number of stator poles 122. The stator 104 also has a set of bobbins 124 (124-1, 124-2) that extend partially into the stator 104 and are disposed between each of the stator poles 122. As FIG. 2 depicts more clearly, the bobbins 124 house the stator windings 106.

Each of the stator windings 106 is wound around a different one of the stator poles 122. As FIG. 2 also depicts, an electrical insulation material, such as Teflon, is disposed between each of the stator windings 106. In the depicted embodiment, in which there are four stator poles 122, there are also four stator windings 106 (106-1, 106-2, 106-3, 106-4). It will be appreciated, however, that in other embodiments, in which the stator 104 is implemented with more than this number of stator poles 122, the permanent magnet stepper motor 100 may also include more than this number of stator windings 106.

As may be appreciated, the stator windings 106 are constructed of an electrically conductive material. Although any one of numerous types of electrically conductive materials may be used, some non-limiting examples include copper, for relatively low-temperature (e.g., <300° F.) applications, anodized aluminum alloy, for relatively high temperature (e.g., >300° F.) applications, and green glass coated magnetic wire, for even higher temperature (e.g., up to 1000° F.) applications. The anodized aluminum alloy may, for example, have an aluminum oxide layer coating that acts as a primary insulator and a ceramic cement, such as a cement manufactured by Saureisen®, as a secondary insulator.

The permanent magnets 108 are coupled to the outer surface 116 of the rotor 102 and are spaced apart from the plurality of stator poles 122 by an air gap 126. Each of the permanent magnets 108 has either its north pole (N) or its south pole (S) disposed closer to the stator 104. Preferably, and as shown more clearly in the simplified cross section depicted in FIG. 3, the permanent magnets 108 are arranged such that the magnetic polarities alternate around the circumference of the rotor 102, and a non-magnetic spacer 301 is disposed between two of permanent magnets 108. Like the permanent magnets 108, the non-magnetic spacers 301 are coupled to the outer surface of the rotor 102 and are spaced apart from the plurality of stator poles 122. It will be appreciated that the permanent magnets 108 may be implemented using any one of numerous types of permanent magnets. Some non-limiting examples include Alnico, Rare earth (NdFeB and SmCo) and Ceramics (Ferrites), just to name a few.

Figure 3:
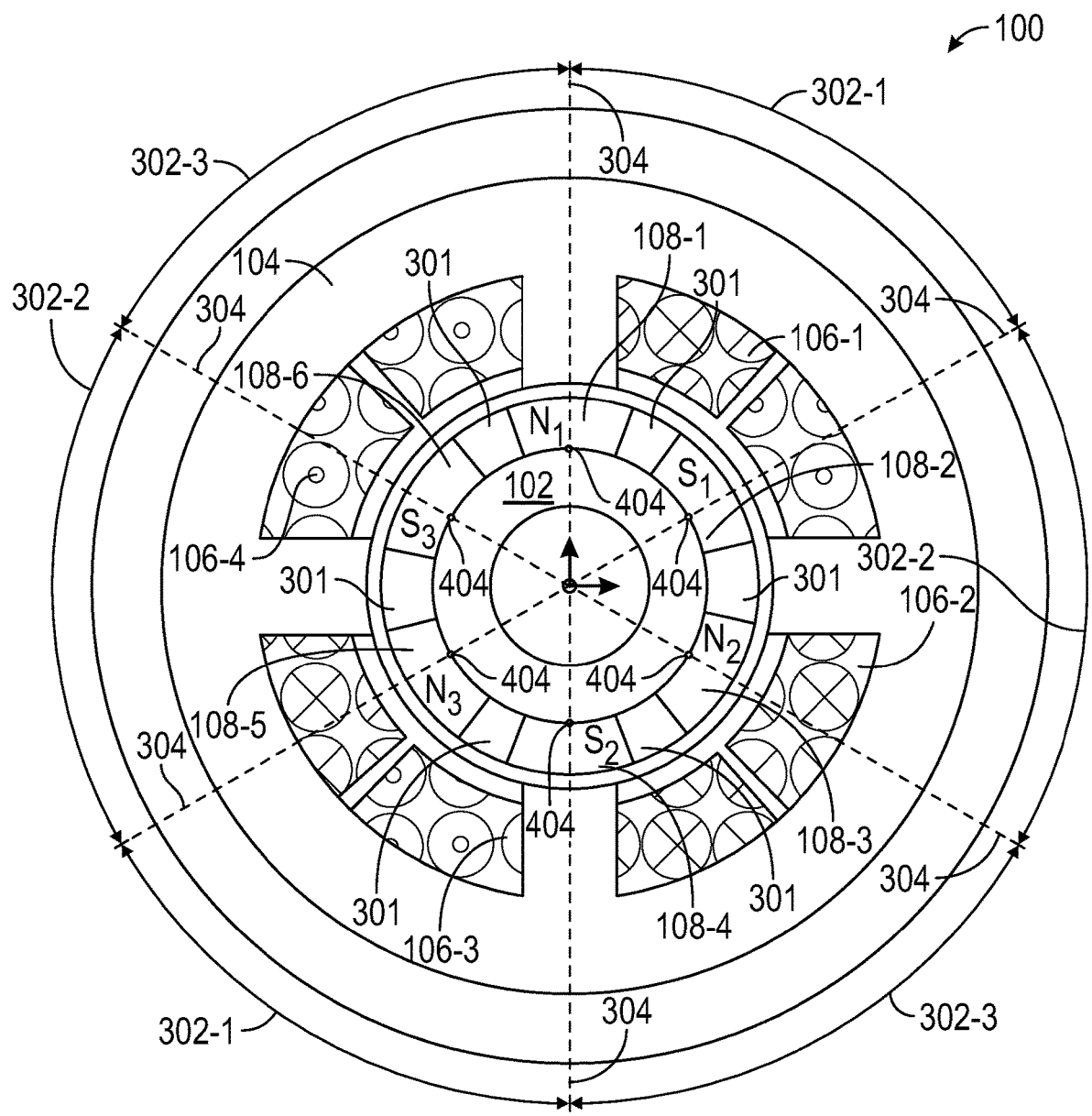
FIG. 3 is a simplified cross section view of one embodiment of a permanent magnet stepper motor.

With continued reference to FIG. 3, it is seen that each of the permanent magnets 108 is shaped like an arc, and each permanent magnet 108 is circumferentially spaced apart from two adjacent permanent magnets by a spacing angle 302. In presently known permanent magnet stepper motors, the arc (inward or outward curvature) length of each permanent magnet 108 is equal, and the spacing angles 302 are all equal. However, in the embodiments disclosed herein, the arc lengths of the permanent magnets 108 may be equal, while in other embodiments, the arc lengths of the permanent magnets 108 may be unequal. In these latter embodiments, two or more of the permanent magnets 108 may have arc lengths that are unequal to the arc lengths of the other permanent magnets 108. Moreover, in the embodiments disclosed herein, the spacing angles 302 are not all equal.

Figure 4:
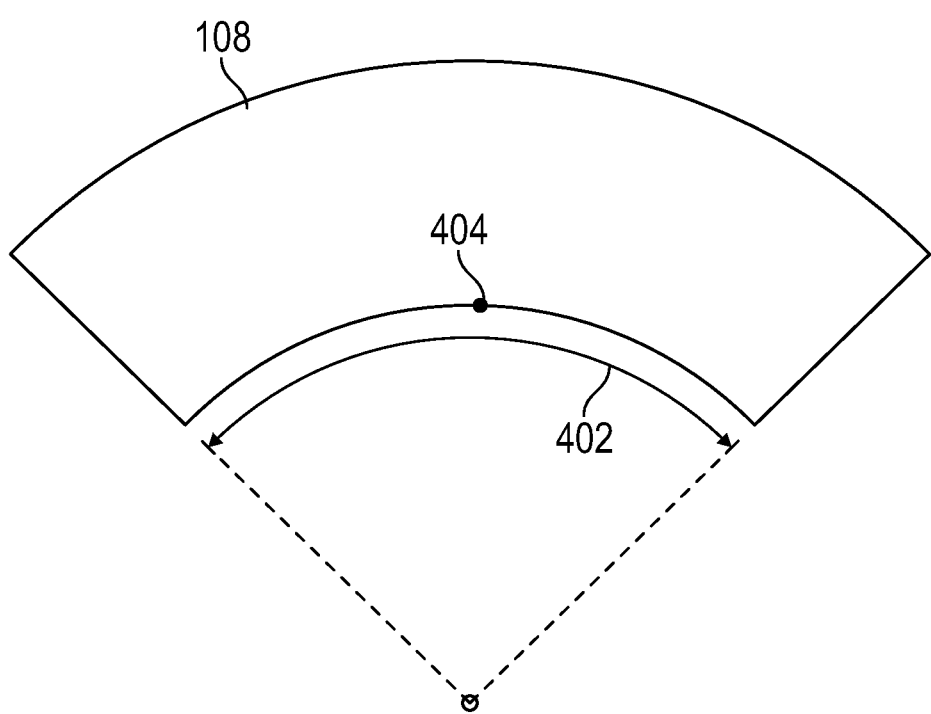
FIG. 4 is a simplified view of a permanent magnet that may be used in the permanent magnet stepper motors disclosed herein.

To clarify the spacing angle 302, reference should now be made to FIG. 4. As was noted, each permanent magnet 108 is shaped like an arc, and thus each has an arc length 402. The arc length 402 of each of the permanent magnets 108, as is also generally known, has an associated center point 404. Now, returning to FIG. 3, it is seen that each permanent magnet 108 has an axis of symmetry 304 that extends perpendicularly from the rotational axis 120 through its associated center point 404. The spacing angle 302 is thus defined herein as the angle between the axis of symmetry 304 of two adjacent permanent magnets 108.

As may be appreciated the number of permanent magnets 108 included in the permanent magnet stepper motor 100 may vary. In the depicted embodiments, the permanent magnet stepper motor 100 includes six permanent magnets 108 (108-1, 108-2, 108-3, . . . 108-6). However, in other embodiments, there may be more or less than this number of permanent magnets 108. Indeed, there may be P-number of permanent magnets 108 coupled to the outer surface of the rotor, where P is a non-zero integer.

It will additionally be appreciated that the number of spacing angles 302 may also vary. In general, the permanent magnets 108 are circumferentially spaced apart by a maximum of (P/2)-number of different spacing angles 302. Thus, in the embodiment depicted in FIG. 3, in which the permanent magnet stepper motor 100 includes six permanent magnets 108 (i.e., P=6), there are three (6/2) different spacing angles 302 (e.g., 302-1, 302-2, 302-3). In another embodiment, for example, if the permanent magnet stepper motor 100 includes eight permanent magnets 108 (i.e. P=8), there will be four (8/2) different spacing angles 302, and so on.

Regardless of the specific number of spacing angles 302, the (P/2)-number of different spacing angles 302 will include at least two of a first spacing angle 302-1 and at least two of a second spacing angle 302-2. The first spacing angle 302-1 will equal (360°/P)−X, and the second spacing angle 302-2 will equal (360°/P)+Y, where X and Y are each a predetermined, non-zero number of angular degrees. In some embodiments, X and Y are equal, but in other embodiments X and Y are unequal.

Figure 5:
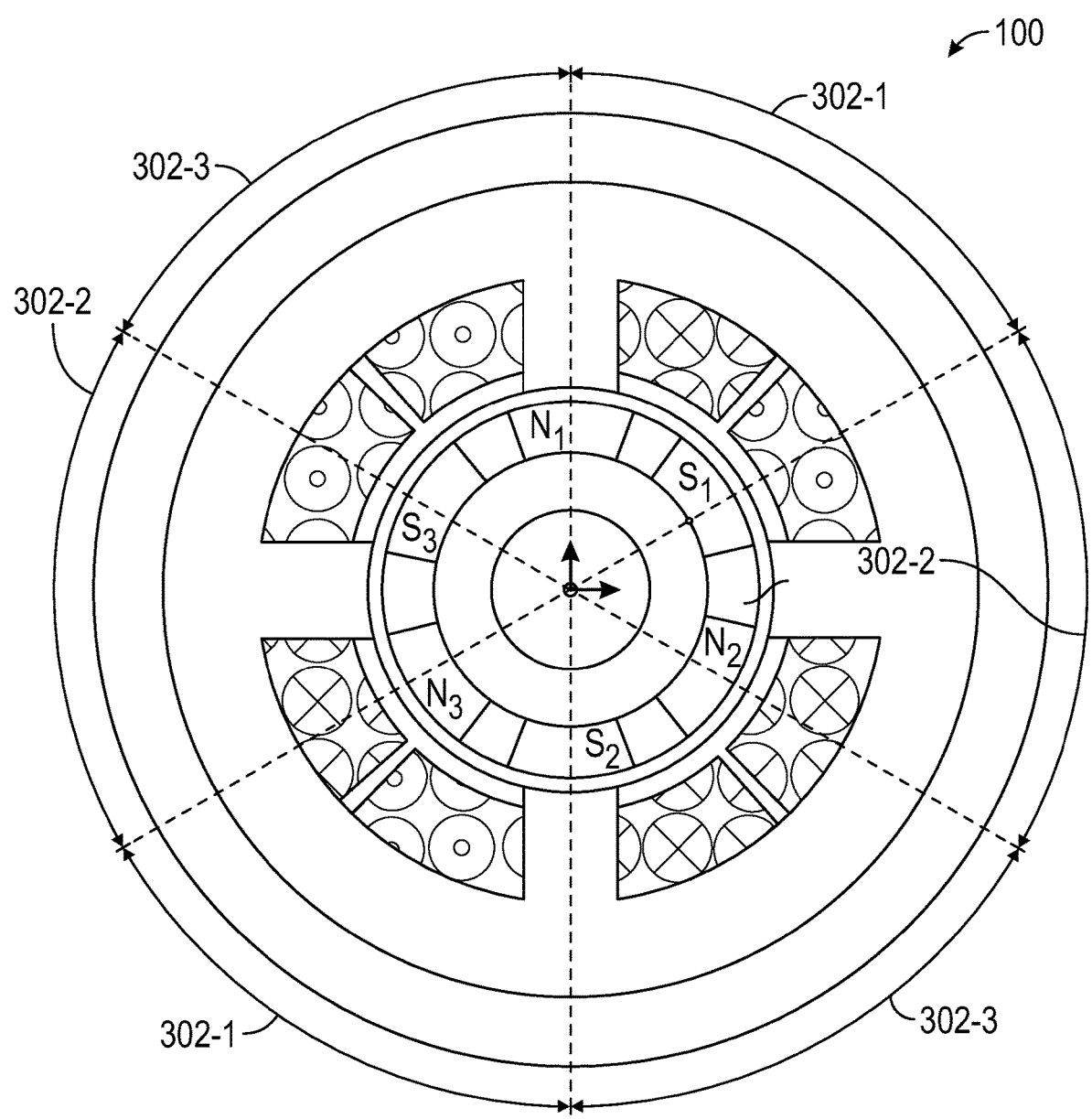
FIG. 5 is a simplified cross section view of another embodiment of a permanent magnet stepper motor.

So, for example, in the embodiment depicted in FIG. 3, the three different spacing angles include at least 60°−X, 60°+Y, and X and Y are equal. In one specific embodiment, X and Y both equal 2. Thus, the first spacing angle 302-1 is equal to 58°, the second angle 302-2 is equal to 62°, and the third angle 302-3 is equal to 60°. In another embodiment, which is depicted in FIG. 5, X and Y are unequal. In one specific embodiment, X equals 3.5 and Y equals 1. Thus, the first spacing angle 302-1 is equal to 56.5°, the second angle 302-2 is equal to 63.5°, and the third angle 302-3 is equal to 59°.

Figure 6:
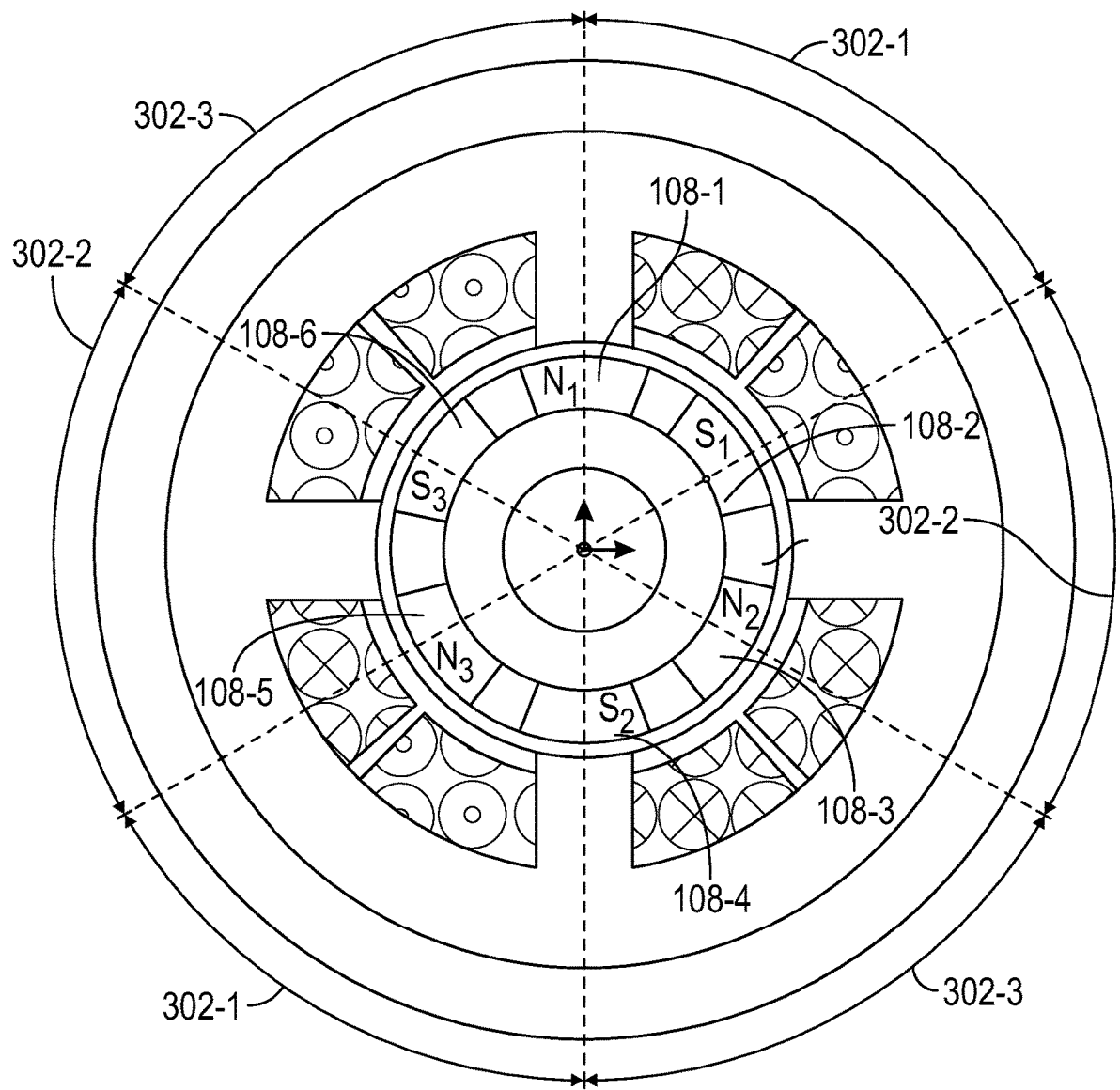
FIG. 6 is a simplified cross section view of yet another embodiment of a permanent magnet stepper motor.

It was noted above that in some embodiments, the arc lengths of two or more of the permanent magnets 108 is unequal to the arc lengths of the other permanent magnets 108. For example, in the embodiment depicted in FIG. 6, the arc length of two of the permanent magnets 108-1, 108-4 is N-number of degrees greater than the arc lengths of the other permanent magnets 108-2, 108-3, 108-5, 108-6. In one specific embodiment, N=10, and thus the arc length of two of the permanent magnets 108-1, 108-4 is 10° greater than the arc lengths of the other permanent magnets 108-2, 108-3, 108-5, 108-6.

The impact that the disclosed embodiments have on the generated detent torque was tested on a two-phase permanent magnet stepper motor 100 of 1.6-inches in diameter and 0.5-inches in length, and having four stator poles 124 each having an arc of 27-degrees, six permanent magnets 108 each having an arc of 40-degrees, four stator windings each having 600 turns and 42-ohms of resistance, and an air gap of 0.030-inches. The results of this testing is graphically depicted in FIG. 7, where curve 702 is the torque generated by a conventional permanent magnet stepper motor, curve 704 is the torque generated by a stepper motor 100 in which the first spacing angle 302-1 is equal to 58°, the second angle 302-2 is equal to 62°, and the third angle 302-3 is equal to 60°, curve 706 is the torque generated by a stepper motor 100 in which the first spacing angle 302-1 is equal to 56.5°, the second angle 302-2 is equal to 63.5°, and the third angle 302-3 is equal to 59°, and curve 708 is the torque generated by a stepper motor 100 in which the first spacing angle 302-1 is equal to 58°, the second angle 302-2 is equal to 62°, and the third angle 302-3 is equal to 60°, and when the arc length of two of the permanent magnets 108-1, 108-4 is 10° greater than the arc lengths of the other permanent magnets 108-2, 108-3, 108-5, 108-6.

Figure 7:
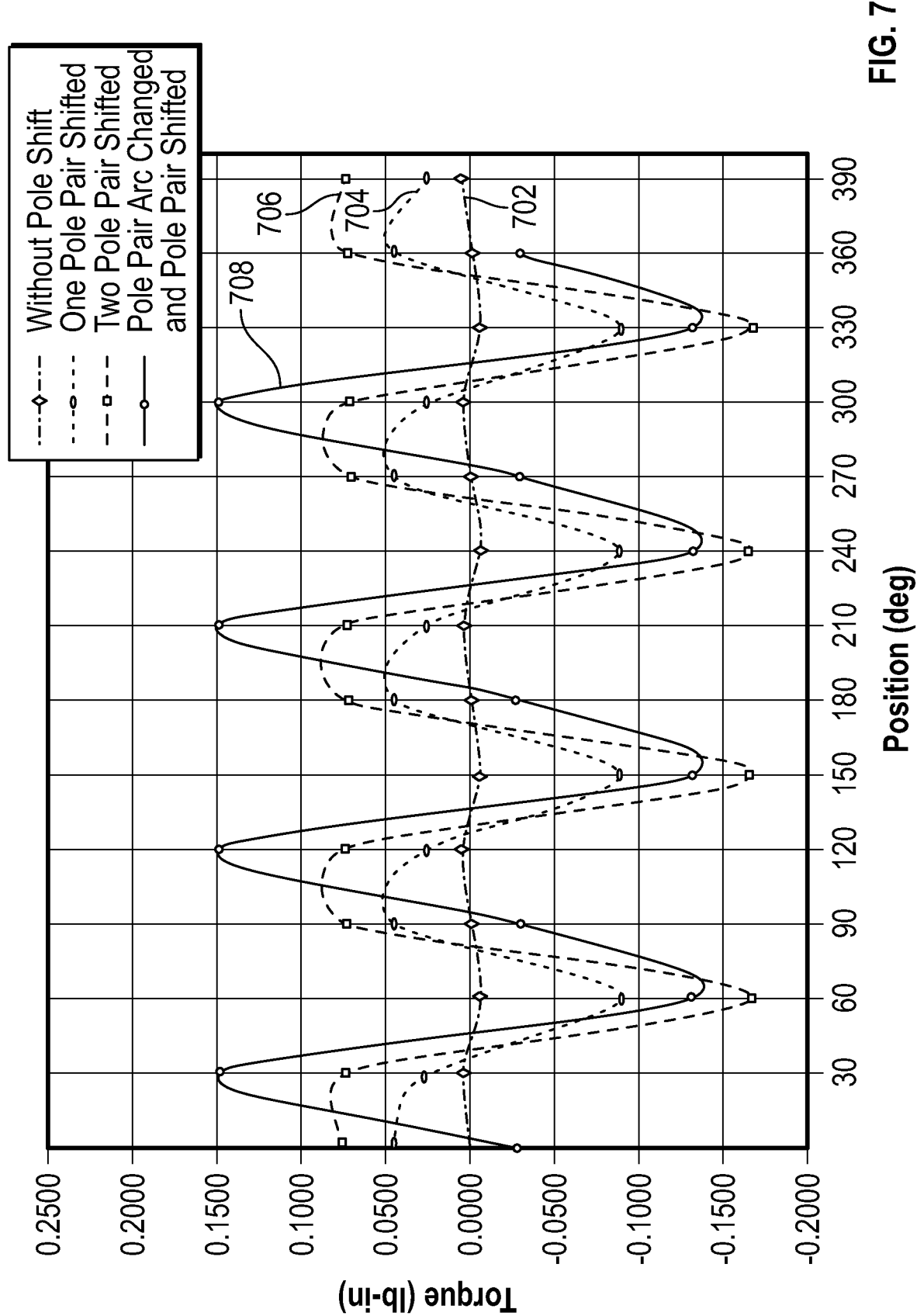
FIG. 7 graphically depicts comparisons of torque versus position for permanent magnet stepper motor embodiments disclosed herein and a conventional permanent magnet stepper motor.

As FIG. 7 clearly, and quite expectedly depicts, the detent torque produced by the conventional permanent magnet stepper motor is almost zero. However, as FIG. 7 quite unexpectedly depicts, the torque produced when the first spacing angle 302-1 is equal to 58°, the second angle 302-2 is equal to 62°, and the third angle 302-3 is equal to 60° is more than 500% higher than the conventional permanent magnet stepper motor. Also, quite unexpectedly, when the first spacing angle 302-1 is equal to 56.5°, the second angle 302-2 is equal to 63.5°, and the third angle 302-3 is equal to 59°, the torque produced is significantly higher. Moreover, the torque produced is even more significantly higher when the first spacing angle 302-1 is equal to 58°, the second angle 302-2 is equal to 62°, and the third angle 302-3 is equal to 60°, and when the arc length of two of the permanent magnets 108-1, 108-4 is 10° greater than the arc lengths of the other permanent magnets 108-2, 108-3, 108-5, 108-6. It will be appreciated that these results can be extended to other configurations beyond just 30-degree (e.g., six permanent magnet) stepper motors, such as 45-degree, 15-degree, 7.5-degree, and so on, permanent magnet stepper motors.

The permanent magnet stepper motors 100 disclosed herein can generate relatively high detent torque without having to use relatively thicker magnets and/or can provide a relatively smaller airgap and/or can increase stator core thickness to operate below the saturation region and/or increase the number of stator winding turns.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A stepper motor, comprising:
 a rotor having an outer surface that defines a circumference, the rotor rotatable about a rotational axis;
 a stator surrounding at least a portion of the rotor, the stator having a plurality of stator poles extending radially inwardly toward the rotor;
 a plurality of stator windings, each stator winding wound around a different one of the stator poles; and
 a plurality of permanent magnets coupled to the outer surface of the rotor and spaced apart from the plurality of stator poles, each permanent magnet shaped like an arc having an arc length, and each permanent magnet circumferentially spaced apart from two adjacent permanent magnets by a spacing angle,
 wherein:
  the arc length of each permanent magnet is equal and has an associated center point,
  each permanent magnet has an axis of symmetry that extends perpendicularly from the rotational axis through its associated center point,
  the spacing angle is defined as an angle between the axis of symmetry of the two adjacent permanent magnets,
  the spacing angles are not all equal,
  there are P-number of permanent magnets coupled to the outer surface of the rotor, and
  the permanent magnets are circumferentially spaced apart by (P/2)-number of different spacing angles.

2. The stepper motor of claim 1, wherein:
 the (P/2)-number of different spacing angles include at least two of a first spacing angle and at least two of a second spacing angle;

the first spacing angle equals (360°/P)−X;
the second spacing angle equals (360°/P)+Y; and
X and Y are each a predetermined, non-zero number of angular degrees.

3. The stepper motor of claim 2 wherein X and Y are equal.

4. The stepper motor of claim 2, wherein X and Y are unequal.

5. The stepper motor of claim 1, wherein:
there are six permanent magnets coupled to the outer surface of the rotor.

6. The stepper motor of claim 5, wherein:
the (P/2)-number of different spacing angles include at least 60°−X, 60°+Y; and
X and Y are each a predetermined, non-zero number of angular degrees.

7. The stepper motor of claim 6, wherein X and Y both equal 2.

8. The stepper motor of claim 6, wherein X equals 3.5 and Y equals 1.

9. The stepper motor of claim 1, wherein the stator windings comprise a conductive material selected from the group consisting of copper and anodized aluminum.

10. A stepper motor, comprising:
a rotor having an outer surface that defines a circumference, the rotor rotatable about a rotational axis;
a stator surrounding at least a portion of the rotor, the stator having a plurality of stator poles extending radially inwardly toward the rotor;
a plurality of stator windings, each stator winding wound around a different one of the stator poles; and
a plurality of permanent magnets coupled to the outer surface of the rotor and spaced apart from the plurality of stator poles, each permanent magnet shaped like an arc having an arc length, and each permanent magnet circumferentially spaced apart from two adjacent permanent magnets by a spacing angle,
wherein:
the arc length of two or more of the permanent magnets is unequal to the arc lengths of the other permanent magnets,
the arc length of each permanent magnet has an associated center point,
each permanent magnet has an axis of symmetry that extends perpendicularly from the rotational axis through its associated center point,
the spacing angle is defined as an angle between the axis of symmetry of the two adjacent permanent magnets,
the spacing angles are not all equal,
there are P-number of permanent magnets coupled to the outer surface of the rotor, and
the permanent magnets are circumferentially spaced apart by (P/2)-number of different spacing angles.

11. The stepper motor of claim 10, wherein:
the (P/2)-number of different spacing angles include at least two of a first spacing angle and at least two of a second spacing angle;
the first spacing angle equals (360°/P)−X;
the second spacing angle equals (360°/P)+Y; and
X and Y are each a predetermined, non-zero number of angular degrees.

12. The stepper motor of claim 11, wherein X and Y are equal.

13. The stepper motor of claim 11, wherein X and Y are unequal.

14. The stepper motor of claim 10, wherein:
there are six permanent magnets coupled to the outer surface of the rotor.

15. The stepper motor of claim 14, wherein:
the (P/2)-number of different spacing angles include at least 60°−X, 60°+Y; and
X and Y are each a predetermined, non-zero number of angular degrees.

16. The stepper motor of claim 15, wherein:
X and Y both equal 2; and
the arc length of two or more of the permanent magnets is 10° greater than the arc lengths of the other permanent magnets.

17. The stepper motor of claim 15, wherein:
X equals 3.5 and Y equals 1; and
the arc length of two or more of the permanent magnets is 10° greater than the arc lengths of the other permanent magnets.

18. The stepper motor of claim 10, wherein the stator windings comprise a conductive material selected from the group consisting of copper and anodized aluminum.

* * * * *